United States Patent
Bläsing

(10) Patent No.: US 8,056,470 B2
(45) Date of Patent: Nov. 15, 2011

(54) TEMPERING CHANNEL FOR CONFECTIONERIES

(75) Inventor: Rüdiger Bläsing, Bielefeld (DE)

(73) Assignee: Sollich KG (DE)

(*) Notice: Subject to any disclaimer, the term of this patent is extended or adjusted under 35 U.S.C. 154(b) by 525 days.

(21) Appl. No.: 12/338,016

(22) Filed: Dec. 18, 2008

(65) Prior Publication Data
US 2009/0183642 A1 Jul. 23, 2009

(30) Foreign Application Priority Data

Dec. 22, 2007 (DE) .......................... 10 2007 062 448

(51) Int. Cl.
*A23G 7/02* (2006.01)
(52) U.S. Cl. ................ 99/468; 62/380; 99/477; 99/483; 99/485; 165/120
(58) Field of Classification Search ............... 99/468, 99/473, 477–479, 483, 485, 486; 62/63, 62/380; 165/120; *A23G 7/02, 3/08, 3/20*
See application file for complete search history.

(56) References Cited

U.S. PATENT DOCUMENTS

| | | | | |
|---|---|---|---|---|
| 3,027,728 A | * | 4/1962 | Greer et al. ..................... | 62/380 |
| 3,472,043 A | * | 10/1969 | Nelson .......................... | 62/380 |
| 3,871,185 A | * | 3/1975 | Harper et al. .................. | 62/380 |
| 4,983,205 A | * | 1/1991 | Kuster et al. .................. | 65/290 |
| 5,467,612 A | * | 11/1995 | Venetucci ........................ | 62/63 |
| 5,622,100 A | * | 4/1997 | King et al. ..................... | 99/477 |
| 5,970,730 A | * | 10/1999 | Koch et al. ..................... | 62/380 |
| 6,263,681 B1 | | 7/2001 | Laut | |
| 6,419,970 B1 | | 7/2002 | Willcocks et al. | |

(Continued)

FOREIGN PATENT DOCUMENTS

CH  117153 A  1/1927

(Continued)

OTHER PUBLICATIONS

European Search Report dated Mar. 19, 2009, for EP08171457, 8 pages.

*Primary Examiner* — Stephen F Gerrity
(74) *Attorney, Agent, or Firm* — Thomas, Kayden, Horstemeyer & Risley, LLP

(57) ABSTRACT

A tempering channel (1) for tempering confectioneries (4) includes a tempering tunnel (2) and a conveyor belt (5) having an upper part (11) and a lower part (12). A transfer location (8) is located at the conveyor belt (5). The confectioneries (4) arrive at the transfer location (8) to be placed on the upper part (11) of the conveyor belt (5). The conveyor belt (5) transports the confectioneries (4) through the tempering tunnel (2). A first tempering apparatus (6) tempers the confectioneries (4) while they are transported through the tempering tunnel (2). The tempering channel (1) includes a control unit (16) and at least one sensor (15) sensing the temperature of the lower part (12) of the conveyor belt (5). The sensor (15) is connected to the control unit (16) to transmit a signal to the control unit (16) depending on the sensed temperature. A second tempering apparatus (14) is connected to the control unit (16). The second tempering apparatus (14) directly act upon the lower part (12) of the conveyor belt (5) in a way that the conveyor belt (5) is tempered to attain a specific temperature in response to a signal of the control unit (16) derived from the signal of the sensor (15).

12 Claims, 2 Drawing Sheets

U.S. PATENT DOCUMENTS

| | | |
|---|---|---|
| 2005/0120726 A1* | 6/2005 | Kamm .............................. 62/380 |
| 2005/0126203 A1* | 6/2005 | Pathier et al. ................... 62/380 |

FOREIGN PATENT DOCUMENTS

| | | |
|---|---|---|
| DE | 4040429 | 7/1991 |
| DE | 19607055 | 8/1997 |
| DE | 69818223 T2 | 7/2004 |
| EP | 0797923 | 10/1997 |
| EP | 1046343 | 10/2000 |
| GB | 755770 | 8/1956 |
| GB | 974824 | 11/1964 |
| GB | 1482484 | 8/1977 |

* cited by examiner

TEMPERING CHANNEL FOR CONFECTIONERIES

CROSS REFERENCE TO RELATED APPLICATIONS

This application claims priority to co-pending German Patent Application No. DE 10 2007 062 448.6 entitled "Verfahren zum Betreiben eines Temperierkanals für Süßwarenstücke sowie Temperierkanal", filed Dec. 22, 2007.

FIELD OF THE INVENTION

The present invention generally relates to a tempering channel for confectioneries and a method of operating such a tempering channel.

Such a tempering channel is especially used for producing and/or processing confectioneries. The confectioneries may include fat containing masses, especially chocolate masses, for which it is desired to influence the crystallization, especially at the bottom of the confectioneries, during solidification in a controlled way. The tempering channel may also be used in connection with sugar containing masses, as for example caramel, hard sugar, glazings, and other masses containing fat as well as sugar.

BACKGROUND OF THE INVENTION

Tempering channels being designed as cooling channels for confectioneries are known from German Patent Application No. DE 196 07 055 A1 corresponding to European Patent No. EP 0 797 923 B1 as well as from European Patent No. EP 1 046 343 B1 corresponding to U.S. Pat. No. 6,263,681 B1. The known tempering channel includes a tempering tunnel in one of its sections. In case the tempering tunnel only extends in a middle portion of the tempering channel, the tempering channel may also include an entrance zone and an exit zone in which the tempering tunnel is not located. An endless and driven conveyor belt is moved through the tempering tunnel. The confectioneries to be tempered are located on the conveyor belt, and they are guided through the tempering tunnel along the length of the tempering channel. The tempering tunnel includes a tempering apparatus with which the confectioneries placed on the conveyor belt are tempered, meaning they are temporarily either cooled or heated. The tempering apparatus may also be designed to have different effects in different zones. In all cases, the tempering apparatus serves to influence the temperature of the confectioneries. Depending on the design of the tempering channel and of the tempering tunnel, respectively, the lower part of the conveyor belt is either moved back below of the tempering tunnel inside of the tempering tunnel or outside of the tempering tunnel. The known tempering channels, especially with respect to their cooling channels, are designed in a way that the tempering apparatus in the tempering tunnel acts upon the confectioneries. For example, the confectionery products are cooled or otherwise subjected to a temperature profile along their way along the length of the tempering tunnel. In many cases, this is sufficient to attain confectioneries in accordance with the desired result.

Other cooling channels in which the cooling apparatus being located in the cooling tunnel is precisely controlled with respect to temperature are also known in the prior art. The control is realized in the sense of optimizing crystallization of components of the confectioneries. Crystallization, for example of chocolate mass, already begins in the tempering machine, and it is then fully or at least widely completed in the cooling tunnel.

Chocolate bar casting apparatuses including a tempering channel and a conveyor belt are also known in the prior art. The conveyor belt is made of steel and the casting molds being made of plastic are supported on the conveyor belt. The chocolate bars are formed in the casting molds. The end of the upper part of the conveyor belt downstream of the tempering tunnel is cooled by spraying cooling water onto from below. Such cooling exclusively serves to directly cool the chocolate bars to simplify detachment of the chocolate bars from the casting molds downstream of the tempering tunnel.

Tempering channels being designed as baking ovens for confectioneries are also known in the prior art. A cooling apparatus is arranged at the end of the tempering channel. The cooling apparatus serves to effectively cool the products.

Another cooling channel being operated in an energy saving way is known in the prior art. The lower part of the conveyor belt is moved through the cooling tunnel to attain an undefined low temperature of the conveyor belt during its entire rotation. However, the undefined low temperature is disadvantageous for different confectioneries, and it is not an optimal temperature as it would make sense for continuing crystallization of a chocolate mass of a product, for example.

A cooling tunnel for confectioneries and long-life bakery products is known from German Patent Application No. DE 40 40 429 A1. The cooling tunnel includes a conveyor belt the lower part of which is moved back through the cooling tunnel. Each section of the cooling channel includes an air cooler. The cooled air is guided over the confectioneries placed on the upper part of the conveyor belt, over the bottom sheet and over the lower part of the conveyor belt. It is desired to keep the temperature of the conveyor belt at the transfer location between the coating machine and the cooling channel at a substantially lower value compared to the value which would be attained when moving back the lower part of the conveyor belt outside of the cooling tunnel. Due to the fact that the cooling channel only includes one cooling apparatus, namely the air cooler, and the air cooler primarily serves to cool the confectioneries, one randomly attains a substantially lower value of the temperature of the lower part of the conveyor belt during cooling. This temperature of the lower part of the conveyor belt changes in different ways depending on the length of the entrance zone. This temperature is disadvantageous for different confectioneries, and it is not an optimal temperature at the transfer location, as it would make sense for continuation of crystallization of a chocolate mass located on a product exiting from a coating machine, for example.

SUMMARY OF THE INVENTION

The present invention relates to a tempering channel for tempering confectioneries. The tempering channel includes a tempering tunnel. A conveyor belt having an upper part and a lower part is designed to be endless and to be rotatingly driven. The conveyor belt is designed and arranged to transport confectioneries being located on the upper part of the conveyor belt in a direction of movement through the tempering tunnel. A first tempering apparatus is designed and arranged to temper the confectioneries being located on the upper part of the conveyor belt while they are transported through the tempering tunnel. A transfer location is located at the conveyor belt. The confectioneries arrive at the transfer location to be placed on the upper part of the conveyor belt. The tempering channel includes a control unit and at least one sensor, the sensor being designed and arranged to sense the temperature of the lower part of the conveyor belt. The sensor is connected to the control unit to transmit a signal to the control unit depending on the sensed temperature. A second tempering apparatus is connected to the control unit. The second tempering apparatus is designed and arranged to directly act upon the lower part of the conveyor belt in a way that the conveyor belt is tempered to attain a specific temperature in response to a signal of the control unit derived from the signal of the sensor.

Due to the fact that during tempering of confectioneries it was primarily desired to change the temperature of the confectioneries, until now tempering channels were only designed and arranged to achieve this goal. The temperature of the conveyor belt that it attains during passage through the tempering tunnel was more or less random. The significance of the temperature of the conveyor belt has never been considered in the prior art. This primarily applies to the transfer location and the following region.

With the novel tempering channel and method of operating it, it is possible to use the part of the conveyor belt being located directly downstream of the transfer location of the tempering channel as seen in the direction of movement of the conveyor belt for positively influencing the confectioneries with respect to temperature, and especially the bottom of the confectioneries. It is possible to eliminate a great number of influencing factors in a way that depending on the kind of confectioneries not only the tempering tunnel but also the entrance zone already beginning downstream of the transfer location is used for tempering in an advantageous way.

The lower part of the conveyor belt is heated and/or cooled (meaning it is "tempered") such that the conveyor belt at the transfer location attains a defined temperature. This temperature differs from the one of the conveyor belt which it more or less randomly attains during tempering of the confectioneries as they are located on the upper part of the conveyor belt. The defined temperature is an optimal temperature being coordinated with the desired tempering of the confectioneries. Due to the fact that the conveyor belt has a defined temperature which usually is maintained, this temperature already has an effect on the pieces of confectionery as they arrive on the conveyor belt at the transfer location. For example, if a coating machine serving to coat the confectionery articles with a chocolate mass is located upstream of the tempering channel, crystallization of the chocolate mass is not only realized by the coating machine located upstream and the cooling tunnel located downstream, but also by the region of the cooling channel located between the transfer location and the cooling tunnel.

The value of the constantly maintained temperature of the conveyor belt depends on various factors, for example the kind of confectioneries, the used coating mass, the effectivity of the cooling tunnel, the load of the conveyor belt, and so forth. It is to be understood that the constantly adjusted optimal temperature relates to the steady state of the apparatus. During interruptions of the production, the adjusted temperature may also be varied in a defined way and adapted to the desired temperature, respectively, to attain the steady state more quickly. It is also possible to change between heating and cooling depending on the temperature with which the conveyor belt leaves the cooling tunnel more or less in a random way. In contrast to the prior art, heating and/or cooling is not directly directed onto the confectioneries, but instead onto the conveyor belt. However, the optimal temperature of the conveyor belt at the transfer location finally serves for thermal treatment of the confectioneries.

The term "tempering channel" for confectioneries as used herein is to be understood as either relating to a heating channel or a cooling channel for confectioneries. The term "tempering" is used in a similar way in the present application, meaning to include both heating and/or cooling. Tempering may be coordinated with the kind and size of the confectionery articles and also with the tempering apparatus used in the tempering tunnel.

The novel method has a number of advantages. It makes use of a portion of the conveyor belt downstream of the transfer location and of the entrance zone which may be characteristic in a way not to stop or to negatively influence the treatment of the confectioneries with respect to temperature at this place. Coordination with the temperature profile of the tempering apparatus in the tempering tunnel is possible. For example, in this way, it is possible to partly discharge the tempering tunnel. In special cases, this may have the positive effect of making it possible to reduce the length of the tempering channel and not having to use a tempering tunnel at all. The different temperatures of the conveyor belt more or less accidentally occurring after its exit from the tempering tunnel are compensated by heating and/or cooling of the lower part of the conveyor belt. The novel method may be used no matter whether the lower part of the conveyor belt is located in the cooling tunnel or below the cooling tunnel, especially in the atmosphere surrounding the cooling tunnel.

Tempering of the conveyor belt may be either realized by an open-loop control or a closed-loop control. In the simplest case, an open-loop control being adjustable to values which have been experienced is sufficient. It is not even necessarily required to continuously sense the temperature of the conveyor belt. Exact adjustment of the optimal temperature is possible with a closed-loop control. It is preferred to sense the temperature of the conveyor belt in the region of the beginning of the lower part of the conveyor belt and to sense the temperature of the conveyor belt in the region of the transfer location and to introduce the resulting signals into the control loop. It is also necessary for this control loop to adjust and to predetermine, respectively, the optimal temperature for the respective confectionery products.

The novel method and the novel tempering channel make it possible to manufacture high-quality confectioneries, especially such ones including a bottom coating. In this way, for example, the crystallization process as beginning in the tempering machine and which should be continued in the coating machine located downstream and in the cooling tunnel are not interrupted or negatively influenced in the beginning portion of the cooling channel outside of the cooling tunnel. Instead, one attains a continuous process of crystallization of chocolate mass, for example. Due to the optimal temperature of the conveyor belt in the region of the transfer location immediately having an effect during first contact with the arriving confectioneries, the crystal structure is improved with respect to quality. This results in additional advantages, for example surface gloss, better gripping properties of the confectioneries, and the like. Additionally, migration of fat through the bottom coating of the confectioneries is reduced, for example. The optimal constant temperature to be attained at the transfer location depends on many factors such as the moving velocity of the conveyor belt, the length of the tempering tunnel and of the tempering channel, the temperature in the tempering tunnel, the number of products on the conveyor belt, room temperature, and so forth. The optimal temperature being coordinated with the respective case of application prevents a wrong constant temperature, as it more or less accidentally occurs when operating the tempering tunnel. This is of great importance for some products. The novel tempering channel for confectionery articles is generally based on tempering channels as they are known in the prior art. In most cases, such a channel includes a tunnel being formed by a series of covers and at least covering a great portion of the length of the channel. In addition, there may be an entrance zone of the tempering channel in which no tunnel section is located.

In all cases, there is a transfer location for the arriving confectionery articles. The transfer location may be formed by a deflecting roller having a comparatively small diameter or even by a knife edge. This serves to make it possible to securely move comparatively small confectionery articles from the machine located upstream onto the conveyor belt of the tempering channel. The tempering tunnel of the tempering channel includes a first tempering apparatus serving to directly influence the temperature of the confectioneries placed on the conveyor belt in the desired way as they are located in the tunnel. However, advantageous tempering of the confectioneries in the tunnel does not necessarily mean that this is also positive for the temperature of the conveyor belt as it is moved through the tunnel. Instead, this temperature may lead to a temperature prevailing at the transfer location which is disadvantageous for the respective confectionery product.

Thus, the novel tempering channel now includes an additional tempering apparatus being designed and arranged to directly influence the temperature of the lower part of the conveyor belt. The lower part of the conveyor belt is heated and/or cooled in a way that the conveyor belt at the transfer location has an optimal temperature being coordinated with the confectioneries. The optimal temperature may be chosen in a way to attain a more or less constant temperature of the respective confectioneries during their movement between the machine located upstream and the tempering taking place in the cooling tunnel to optimally process the confectioneries along the entire way. In this way, a possible temperature difference of the conveyor belt at the beginning of the lower part of the conveyor belt may be compensated.

The conveyor belt is at least partly made of plastic. The plastic may be in the form of plastic film or plastic filaments forming the conveyor belt, for example in a woven way. In this way, the conveyor belt may have a structured surface such that the bottom parts of the confectioneries attain this structure. A closed bottom surface, preferably without air bubbles or the like is a quality feature of coated confectioneries. This advantageous effect may be realized by the present invention.

It is preferred to arrange one sensor or a plurality of sensors serving to sense and determine the temperature of the conveyor belt. The sensors may be arranged upstream and/or downstream of the tempering apparatus and upstream of the transfer location. Such a sensor may also be arranged directly at the transfer location since it is desired to attain the optimal temperature at this place where the first contact of the arriving confectioneries with the surface of the conveyor belt takes place.

There are a number of different useful possibilities of realizing the design of the tempering apparatus influencing the surface of the conveyor belt. Usually, the tempering apparatus is designed at a completely separate apparatus in addition to the first tempering apparatus of the tempering tunnel. This also means that the first tempering apparatus and the second tempering apparatus are separately and independently controlled.

However, it is also possible to design and arrange the first tempering apparatus and the second tempering apparatus to be connected and to combine them in this special way. However, the apparatuses then include a plurality of sections which can be separately and independently controlled. Especially, the apparatuses may be combined in a way that the second tempering apparatus is designed as a tunnel-shaped chamber through which the lower part of the conveyor belt is moved.

For transmitting heat and for influencing the temperature of the conveyor belt, it is possible to use all kinds of heat transmission as it is known in connection with the first tempering apparatus being used in the region of the tempering tunnel. Especially, contact tempering, convection tempering or radiation tempering may be used. It is also possible to use combined apparatuses. It has been found to be especially advantageous if the second tempering apparatus acting upon the lower part of the conveyor belt includes a ventilator or fan for tempered air.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
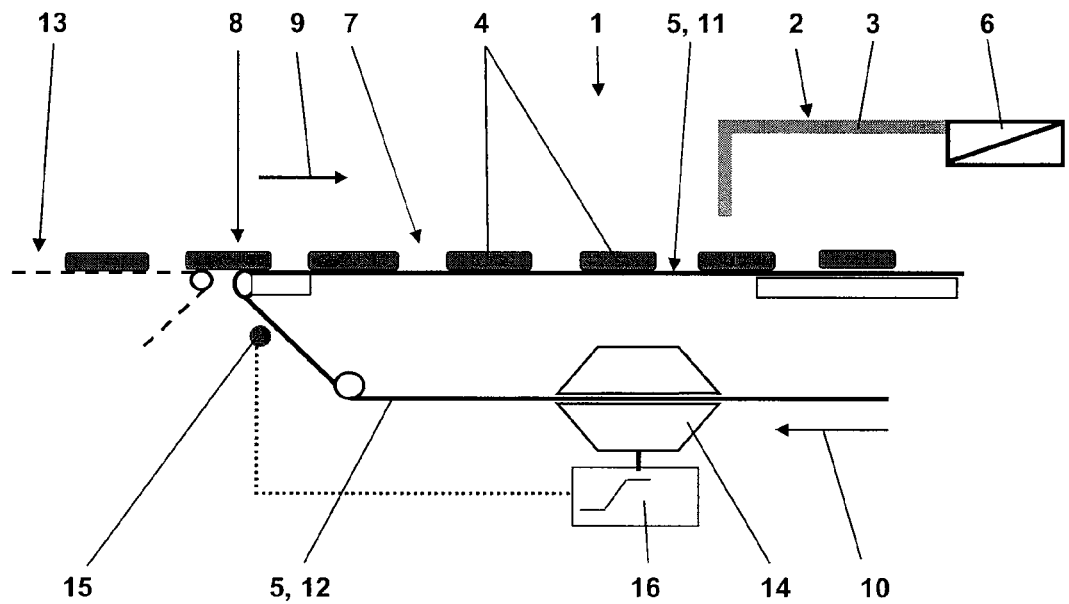
FIG. 1 is a schematic side view of a first exemplary embodiment of the novel tempering channel.

Referring now in greater detail to the drawings, FIG. 1 schematically illustrates elements of a first exemplary embodiment of the novel tempering channel 1. The tempering channel 1 includes a tempering tunnel 2. Usually, the tempering tunnel 2 includes a plurality of sections located one after the other and each including at least one cover 3. FIG. 1 only illustrates a part of one of these sections. In this way, a tempering tunnel 2 is formed through which confectioneries 4 being placed on a conveyor belt 5 are transported through the tempering tunnel 2 in a way to be tempered in the tempering tunnel 2. Tempering is to be understood as including both cooling and/or heating.

The tempering tunnel 2 includes a first tempering apparatus 6 having a design as it is known in the prior art. The tempering apparatus 6 serves to heat and/or cool the confectioneries 4 inside of the tempering tunnel 2. For example, the tempering apparatus 6 may be operated in the sense of realizing contact tempering, convection tempering and/or radiation tempering.

In addition to the tempering tunnel 2, the tempering channel 1 includes an entrance zone 7 extending from a transfer location 8 to the end of the tempering tunnel 2. Such an entrance zone 7 may have different lengths in different embodiments of the tempering channel 1, and there may even be no entrance zone 7 at all. The same applies to an exit zone (not illustrated) beginning at the end of the cooling tunnel 2 and extending to a deflection location of the conveyor belt 5. The deflection location is the place where the conveyor belt 5 is deflected to change its direction of movement in the sense of a return movement. For example, the deflection location may be designed as a deflecting roller having a comparatively small diameter, a knife edge, and the like. Such a deflection of the conveyor belt 5 is also realized at the transfer location 8.

The conveyor belt 5 being designed as an endless belt and being continuously driven according to arrows 9 and 10 in a revolving way during operation of the tempering channel 1 includes an upper part 11 and a lower part 12. The upper part 11 of the conveyor belt 5 is moved through the tempering tunnel 2. The upper part 11 is the part of the conveyor belt 5 on which the confectioneries 4 are located. The lower part 12 of the conveyor belt 5 may be arranged inside of the tempering channel 1 below the upper part 11 or outside of the tempering channel 1, as this is illustrated in FIG. 1. The lower part 12 is the part of the conveyor belt 5 is the part which only serves to make the return movement towards the transfer location 8.

Upstream of the tempering channel 1 (as seen in a horizontal direction), there may be a coating machine 13 which is only schematically illustrated. The coating machine 13 also includes a revolving endless conveyor belt on which the confectioneries 4 are placed and by which the confectioneries 4 exit the coating machine 13 after being coated such that they reach the transfer location 8 of the tempering channel 1. Instead of the coating machine 13, there may also be a different apparatus for treating the confectioneries 4. Such an apparatus may also be located directly after the transfer location 8 at the beginning of the entrance zone 7 to act upon the confectioneries 4. For example, such an apparatus may be a dosing unit or a decorating unit (not illustrated).

The tempering channel 1 includes a second tempering apparatus 14. The lower part 12 of the conveyor belt 5 is moved through the second tempering apparatus 14 such that the conveyor belt 5 attains the desired and necessary, respectively, temperature. For example, the tempering apparatus 14 may be designed as a box-like unit as illustrated in FIG. 1. The temperature of the conveyor belt 5 in a region just upstream of the transfer location 8 (as seen along the path of movement of the conveyor belt 5) or at the transfer location 8 is measured and determined by a sensor 15 being arranged in the region of the lower part 12 of the conveyor belt 15, for example close to the transfer location 8. Preferably, the sensor 15 is designed as a contactless temperature sensor. The sensor 15 is connected to a control unit 16 being connected to the tempering apparatus 14 such that the temperature of the conveyor belt 5 at the transfer location 8 is controlled or adjusted. In this way, the conveyor belt 5 at the transfer location 8 and in the following portion of the entrance zone 7 attains such a temperature as it is advantageous for treating the confectioneries 4 with respect to temperature in the entrance zone 7 of the tempering channel 1. While the first tempering apparatus 6 of the tempering tunnel 2 is designed and arranged to directly have an influence on the temperature of the confectioneries 4, the second tempering apparatus 14 is designed and arranged to directly have an influence on the temperature of the conveyor belt 5 in the region of the transfer location 8 in a way that one attains a useful temperature in the following. The temperature is chosen such that it is optimal for tempering the arriving confectioneries 4. In other words, the second tempering apparatus 14 is designed and arranged to indirectly have an influence on the temperature of the confectioneries 4.

Figure 2:
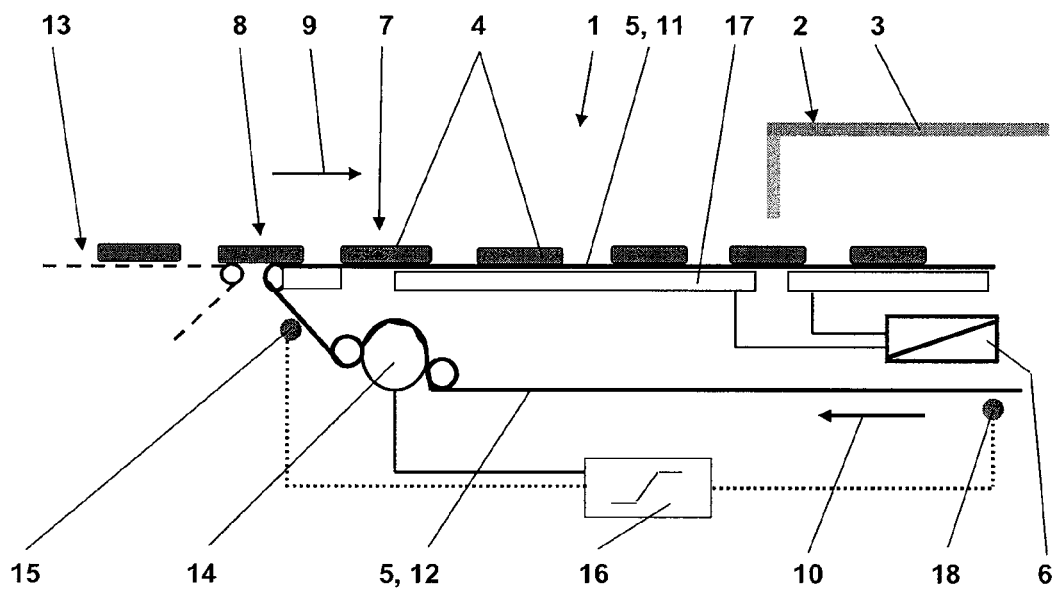
FIG. 2 is a schematic side view of a second exemplary embodiment of the novel tempering channel.

The exemplary embodiment of the novel tempering channel 1 according to FIG. 2 has a lot of features in common with the embodiment illustrated in FIG. 1. Consequently, with respect to the common features, it is referred to the above description. In contrast to the tempering channel 1 according to FIG. 1, the tempering apparatus 6 as illustrated in FIG. 2 is designed and arranged such that not only the confectioneries 4 inside of the tempering tunnel 1 are tempered. Instead, a bottom plate 17 is arranged in the region of the entrance zone 7, the temperature of the bottom plate 17 also being controlled by the tempering apparatus 6. The tempering apparatus 14 is designed to have the shape of a roller such that the lower part 12 of the conveyor belt 5 is tempered due to contact with the surface of the roller. In addition to the sensor 15, another sensor 18 is arranged, the sensor 18 being designed and arranged to sense and determine the temperature of the conveyor belt 5 at the beginning of the lower part 12. The sensor 18 could also be arranged above the upper part 11 at the end or in the region of the exit zone. Anyway, it is arranged downstream of the tempering tunnel 2 to sense and determine the temperature of the conveyor belt 5 at this place and to introduce the signals derived from the sensed temperature into the control loop, as this is also realized for the signals of the sensor 15. The control unit 16 is then operated in a way that the temperature difference which results at the conveyor belt 5 during its movement through the tempering tunnel 2 more or less accidentally can be compensated such that the conveyor belt 5 at the transfer location 8 has the desired optimal temperature.

Figure 3:
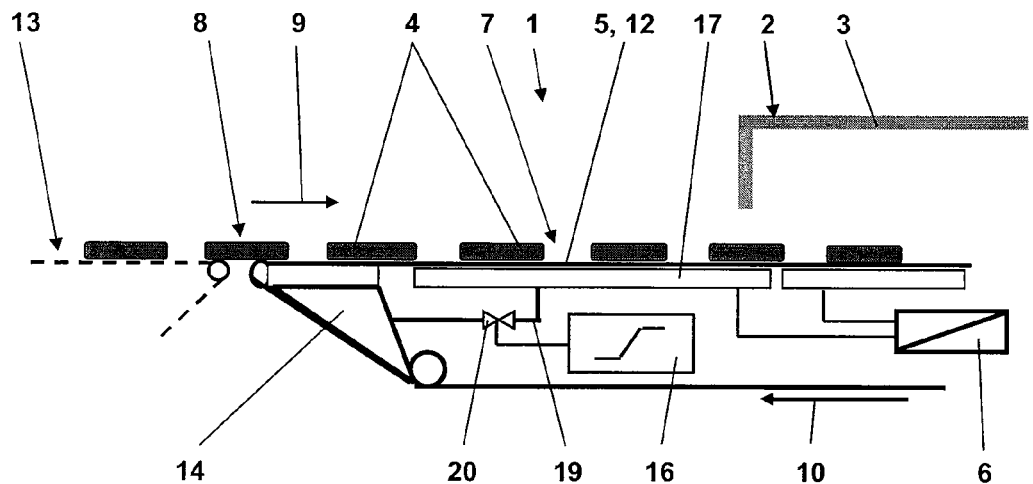
FIG. 3 is a schematic side view of a third exemplary embodiment of the novel tempering channel.

The tempering channel 1 according to FIG. 3 has a similar design as the above described exemplary embodiments of the tempering channel 1. Consequently, with respect to the common features, it is referred to the above descriptions. In the illustrated exemplary embodiment, the tempering apparatus 6 of the tempering tunnel 2 also controls the temperature of a bottom plate 17. The tempering apparatus 14 is connected to the bottom plate 17 via a conduit 19 including a valve 20. It is to be understood that only a part of the tempering circuit is illustrated. For example, the tempering circuit is operated with tempering water. In the illustrated example, the control unit 16 is designed as a pure open-loop control unit 16. A desired optimal temperature is simply adjusted at the transfer location 8, and it is observed from time to time. In the steady state, also depending on the respective confectionery product, one has a simple possibility of controlling the temperature in accordance with experience.

Figure 4:
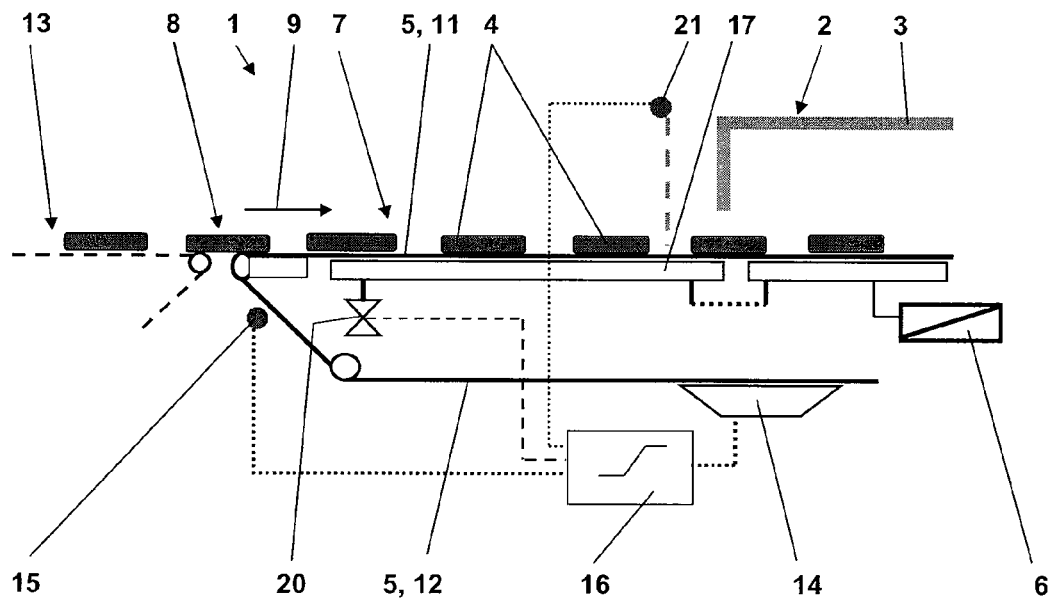
FIG. 4 is a schematic side view of a fourth exemplary embodiment of the novel tempering channel.

In the exemplary embodiment of the novel tempering channel 1 according to FIG. 4, the tempering apparatus 14 is arranged below the lower part 12 of the conveyor belt 5. The tempering apparatus 14 may be connected to the tempering apparatus 6 of the tempering tunnel 2. In addition to the sensor 15 for sensing the temperature of the conveyor belt 5 at the transfer location 8, another sensor 21 serving to sense the temperature of the conveyor belt 5 upstream of the entrance into the tempering tunnel 2 may be arranged. The sensor 21 serves to determine how the conveyor belt 5 has changed its temperature during its movement from the transfer location 8 to the beginning of the tempering tunnel 2. It may make sense to adjust the temperature to be in an optimal region being between the temperature at the deflecting location 8 and the position of the conveyor belt 5 at the beginning of the tempering tunnel 2. However, it is also possible to arrange additional sensors (not illustrated) at this place and to also process their signals in the control unit 16. These additional sensors do not sense the temperature of the conveyor belt 5, but instead the temperature of the confectioneries 4 at the entrance into the tempering tunnel 2. The temperature supply of the tempering apparatus 14 in this embodiment is also designed and arranged such that a partial heat circuit is derived from the tempering apparatus 6 via the valve 20.

Many variations and modifications may be made to the preferred embodiments of the invention without departing substantially from the spirit and principles of the invention. All such modifications and variations are intended to be included herein within the scope of the present invention, as defined by the following claims.

I claim:

1. A tempering channel for tempering confectioneries, comprising:
    a tempering tunnel;
    a conveyor belt having an upper part and a lower part, said conveyor belt being designed to be endless and to be rotatingly driven, said conveyor belt being designed and arranged to transport confectioneries being located on said upper part of said conveyor belt in a direction of movement through said tempering tunnel;
    a first tempering apparatus, said first tempering apparatus being designed and arranged to temper the confectioneries being located on said upper part of said conveyor belt while they are transported through said tempering tunnel;
    a transfer location, said transfer location being located at said conveyor belt, the confectioneries arriving at said transfer location to be placed on said upper part of said conveyor belt;
    a control unit;
    at least one sensor, said sensor being designed and arranged to sense the temperature of said lower part of said conveyor belt, said sensor being connected to said control unit to transmit a signal to said control unit depending on the sensed temperature; and
    a second tempering apparatus, said second tempering apparatus being connected to said control unit; second tempering apparatus being designed and arranged to directly act upon said lower part of said conveyor belt in a way that said conveyor belt is tempered to attain a specific temperature in response to a signal of said control unit derived from said signal of said sensor.

2. The tempering channel of claim 1, wherein said second tempering apparatus is designed and arranged to change the temperature of said lower part of said conveyor belt in a way that the confectioneries obtain an optimal temperature.

3. The tempering channel of claim 1, wherein said sensor is located downstream of said second tempering apparatus.

4. The tempering channel of claim 1, further comprising a plurality of sensors, said sensors being designed and arranged to sense the temperature of said lower part of said conveyor belt, at least one of said sensors being located upstream of said second tempering apparatus and at least one of said sensors being located downstream of said second tempering apparatus.

5. The tempering channel of claim 1, wherein said second tempering apparatus is designed and arranged to be completely separate from said first tempering apparatus.

6. The tempering channel of claim 1, wherein said second tempering apparatus is designed and arranged to be connected to said first tempering apparatus.

7. The tempering channel of claim 1, wherein said second tempering apparatus is designed as a chamber having the shape of a channel, said lower part of said conveyor belt being moved through said chamber.

8. The tempering channel of claim 1, wherein said second tempering apparatus is designed and arranged to operate according to one tempering method selected from the group consisting of contact tempering, convection tempering and radiation tempering.

9. The tempering channel of claim 1, wherein said second tempering apparatus includes a fan being designed and arranged to direct tempered air onto said lower part of said conveyor belt.

10. The tempering channel of claim 1, wherein said tempering channel is designed as a cooling channel.

11. The tempering channel of claim 1, wherein said tempering channel is designed as a heating channel.

12. The tempering channel of claim 1, wherein said conveyor belt is made of plastic.

* * * * *